United States Patent
Schrattenecker

[19]

[11] Patent Number: 6,126,098
[45] Date of Patent: Oct. 3, 2000

[54] CHOPPER FOR BREAKING UP STALKS

[76] Inventor: Franz Schrattenecker, Edenaichet 21, A-4773 Eggerding, Austria

[21] Appl. No.: 09/187,117

[22] Filed: Nov. 5, 1998

[30] Foreign Application Priority Data

Nov. 7, 1997 [DE] Germany .................. 197 49 337

[51] Int. Cl.⁷ .................................................. B02C 18/18
[52] U.S. Cl. ........................... 241/47; 241/243; 241/605
[58] Field of Search ........................ 241/101.742, 243, 241/605, 47

[56] References Cited

U.S. PATENT DOCUMENTS

| | | | |
|---|---|---|---|
| 2,561,069 | 7/1951 | Peterson | 241/605 X |
| 3,350,017 | 10/1967 | Howell et al. | 241/243 X |
| 3,392,769 | 7/1968 | Gronberg | 241/243 X |
| 4,218,022 | 8/1980 | Boehm et al. | 241/101.7 |
| 4,637,406 | 1/1987 | Guinn et al. | |
| 4,998,679 | 3/1991 | Bender | 241/243 |
| 5,042,973 | 8/1991 | Hammarstrand | |

FOREIGN PATENT DOCUMENTS

| | | |
|---|---|---|
| 2081240 | 4/1993 | Canada . |
| 0479329 | 4/1992 | European Pat. Off. . |
| 19530028 | 2/1987 | Germany . |
| 3620747 | 7/1987 | Germany . |
| 3641796 | 6/1988 | Germany . |

OTHER PUBLICATIONS

23417III45e Apr. 1956 DEX.

*Primary Examiner*—John M. Husar
*Attorney, Agent, or Firm*—Dilworth & Barrese

[57] ABSTRACT

A chopper for breaking up stalks, chiefly straw is provided with a chopper housing in which a rotor equipped with cutting tools and a drive are housed and which is positioned under a feed hopper. A baffle plate forms a chopping floor in the area of which counterblades are positioned. Slits are positioned in the chopper floor essentially over the width of the rotor.

14 Claims, 3 Drawing Sheets

CHOPPER FOR BREAKING UP STALKS

BACKGROUND OF THE INVENTION

The invention concerns a chopper for breaking up stalks, chiefly for breaking up straw behind the hopper end of a combine, with a chopper housing in which a rotor equipped with cutting tools and a drive is housed and which is positioned under a feed hopper, whose front and rear walls run down to and delimit the feed slot of the rotor, with a baffle plate forming a chopper floor, in whose area the counterblades are positioned, and with an outlet and an air discharge hood positioned above this outlet, which is delimited at its upper and lower edges from the feed hopper and the outlet by dust baffles positioned on the blade jacket cylinder.

A straw chopper of this type is known from DE 195 30 028 A1. In this known straw chopper the jacket-like air ring containing and rotating with the rotor is interrupted by the fact that the straw baffle plate located under the hopper end and forming the rear wall of the feed hopper is curved in such manner that the upper curved end lies under the hopper, while the lower end runs approximately perpendicular into the feed of the chopper housing. The task of the invention is to create a chopper of the type initially described, in which the circulation created by the rotor is even more strongly deflected or interrupted so that the take-up of the straw by the chopper is further encouraged.

SUMMARY OF THE INVENTION

According to the invention, this task is performed by the fact that slits that run essentially over the width of the rotor are positioned in the chopper floor.

Thanks to these slits, the updraft created by the narrowing of the rotor centrifugal circuit and the countercutters is deflected outward or interrupted by the slits in the straw feed area. In this way a suction effect, instead of an updraft hindering the take-up of the straw, is achieved by the rotation of the rotor.

The disruptive updraft can additionally be prevented by the positioning of bodies that interrupt the air flow in the area of the chopper floor.

These bodies can have a step-shaped profile.

According to one preferred embodiment of the invention, the hood has at least one front air exit window between its upper and edge areas, which are equipped with dust baffles positioned on the blade jacket cylinder.

BRIEF DESCRIPTION OF THE DRAWINGS

One embodiment of the invention is described below in greater detail by means of the drawing, which shows, in FIG. 1 a first embodiment of a chopper according to the invention in schematic cross-section, FIG. 2 a representation of a second embodiment of the invention corresponding to FIG. 1, and FIG. 3 a view of the chopper according to FIGS. 1 and 2 in the direction of arrow A in FIG. 2.

DESCRIPTION OF THE PREFERRED EMBODIMENTS

Figure 1:
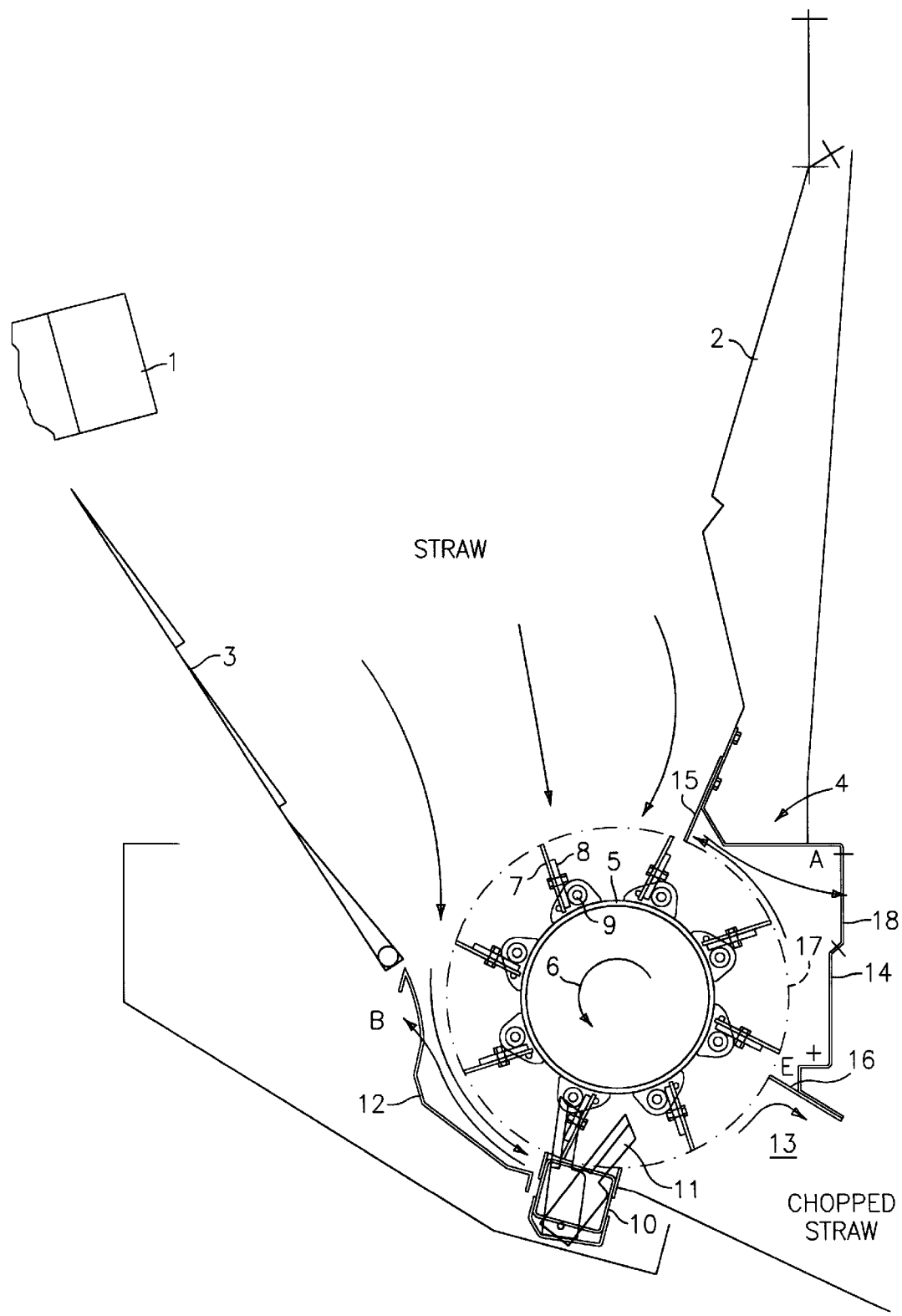

The funnel-shaped feed housing for the straw is positioned under the end of a hopper 1 of a combine. Front wall 2 and back wall 3 of said funnel-shaped feed housing run into chopper housing 5 and delimit the feed area covered with rotor 5 in the chopper housing. Blades 7 are positioned in customary manner on the jacket of the rotor rotating in the direction of arrow 6, the blade retainer plates 8 for which said blades 7 can be permanently attached or can be attached to swivel on axles 9 on the rotor jacket 5.

A blade beam 10 is permanently positioned in the outlet area of the chopper housing, in which counterblades 11 that work together with blades 7 are attached.

The area between hopper wall 3 and blade beam 10 is sealed by chopper floor 12, which forms part of chopper housing 4. The chopper floor is equipped over the width of rotor 5 with slits for penetration of air.

A hood 14 is positioned above the outlet 13 of the chopper housing, which said hood 14 is equipped at its upper end with a dust baffle 15 and at its lower end with a dust baffle 16, which is positioned in the manner illustrated on blade jacket cylinders 17 covered by blades 7. The front of the hood with equipped with an opening 18 from which the air can exit freely.

Figure 2:
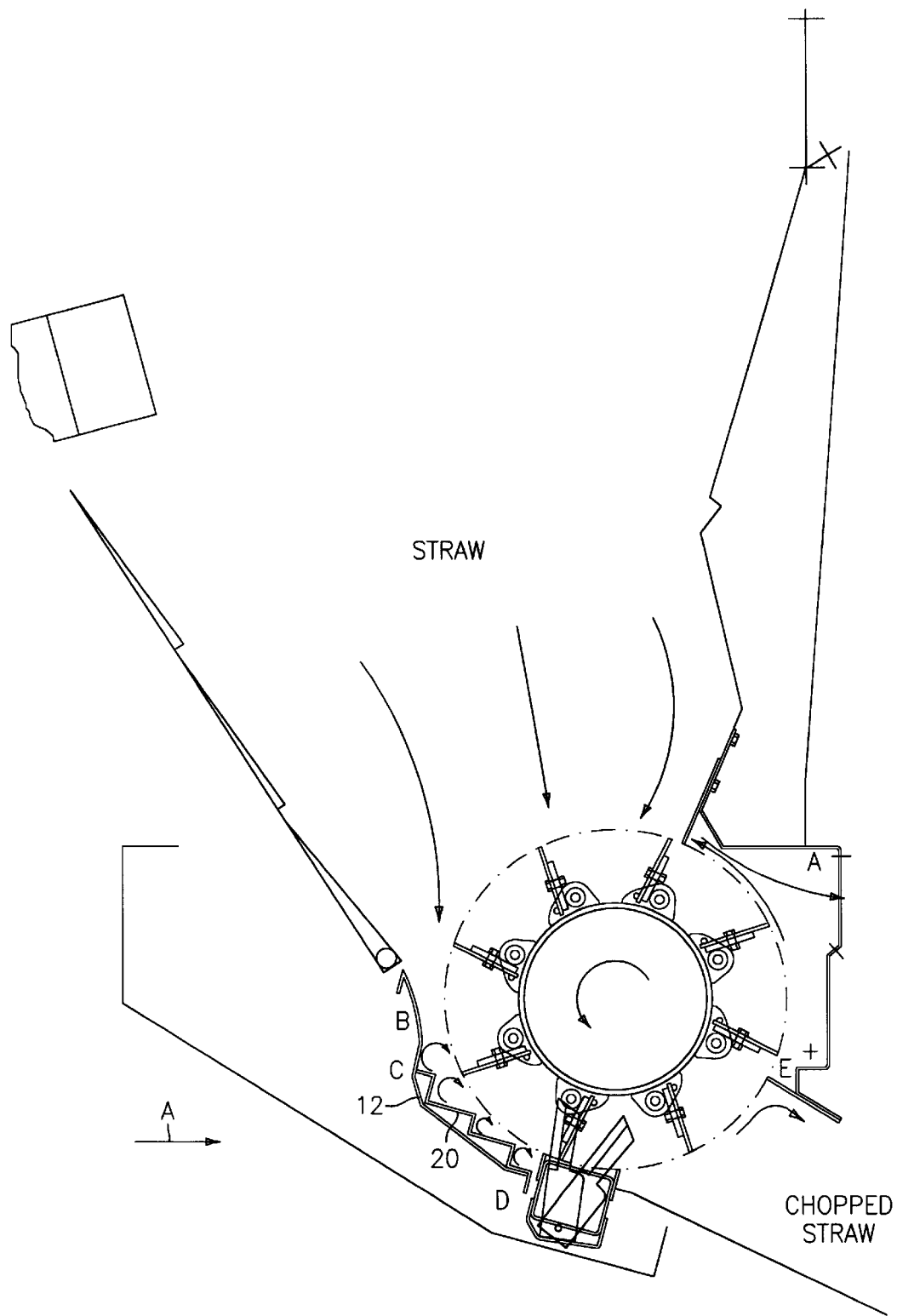

The embodiment according to FIG. 2 differs from the embodiment according to FIG. 1 only in that step-like dust baffles 20 are positioned in the chopper floor 12, which said baffles additionally break and circulate the disruptive updraft.

Figure 3:
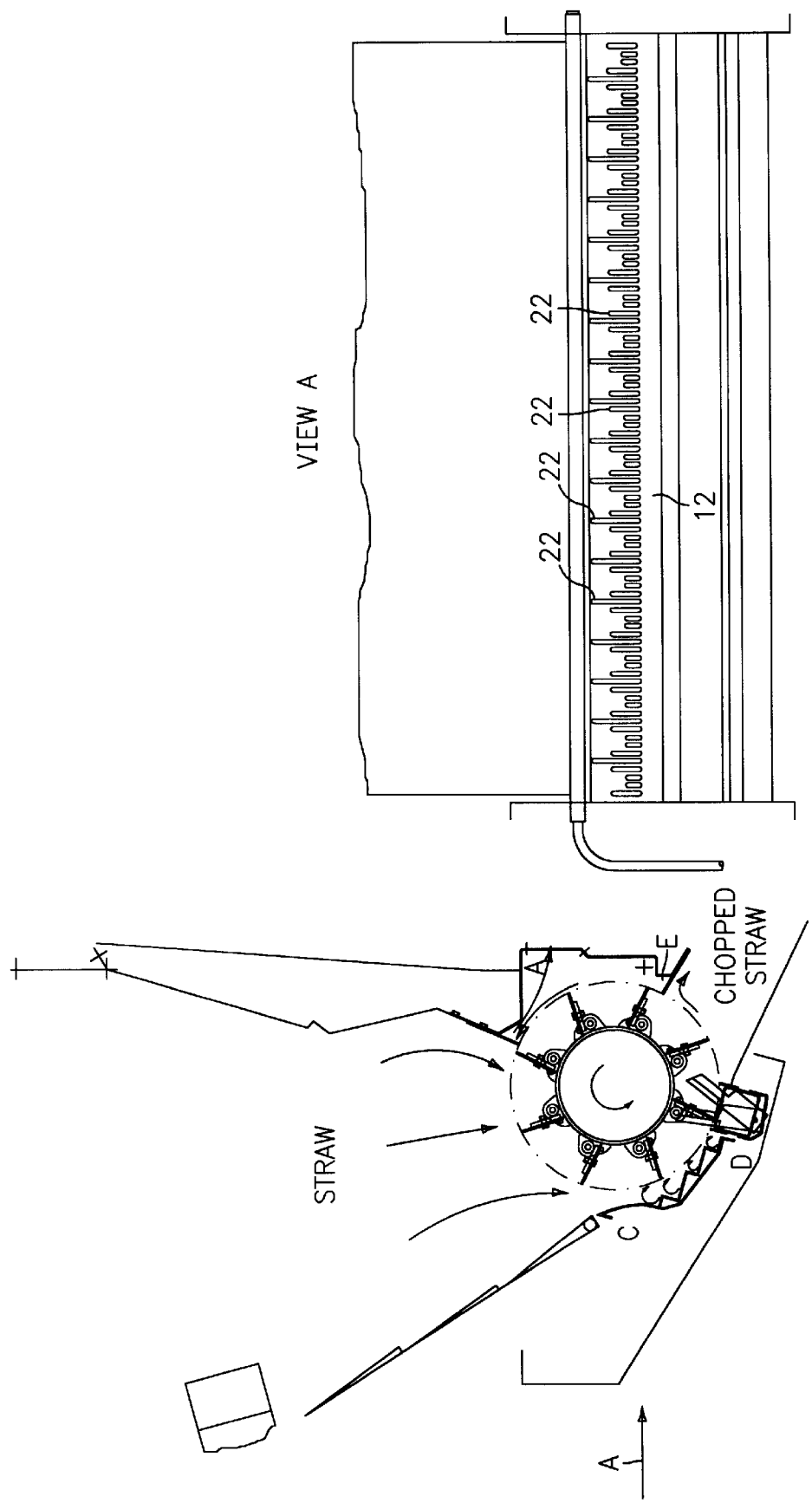

A rear view of the chopper in the direction of arrow A is visible in FIG. 3. Vertical, closely adjoining slits 22 of various lengths are positioned in the chopper floor 12 and serve for air exchange or exhaust.

What is claimed is:

1. Chopper for breaking up stalks, behind a hopper end of a combine, comprising a chopper housing in which a rotor equipped with cutting tools and a drive are housed in such a manner to rotate and which is positioned under a feed hopper and having front and rear walls arranged to extend to and define a feed slot of the rotor, a baffle plate forming a chopper floor, counter blades positioned in an area of the chopper floor, and an outlet and an air discharge hood positioned above said outlet, a blade jacket cylinder arranged to be covered by blades of the cutting tools, said air discharge hood bounded at upper and lower edges thereof from the feed hopper and the outlet by dust baffles positioned on the blade jacket cylinder, wherein slits are positioned in the chopper floor essentially over the width of the rotor and extend through the chopper floor for air exchange and exhaust.

2. Chopper according to claim 1, wherein bodies interrupting air flow are positioned in the area of the chopper floor.

3. Chopper according to claim 2, wherein the bodies have a step-shaped profile.

4. Chopper according to claim 1, characterized by the fact that between the upper and lower edges, which are equipped with the dust baffles attached to the blade jacket cylinder, the hood has an outlet window for air.

5. Chopper according to claim 2, wherein the upper and lower edges, which are equipped with the dust baffles attached to the blade jacket cylinder, the hood has an outlet window for air.

6. Chopper according to claim 3, wherein the upper and lower edges, which are equipped with the dust baffles attached to the blade jacket cylinder, the hood has an outlet window for air.

7. Chopper according to claim 1, wherein said slits are arranged to deflect updraft created by narrowing of a rotor centrifugal circuit and the countercutters, to create a suction effect instead of an updraft hindering take-up of the stalks.

8. Chopper according to claim 7, wherein said slits extend vertically, are closely adjoining and are of various lengths in the chopping floor.

9. Chopper according to claim 8, wherein bodies interrupting air flow are positioned in the area of the chopper floor and have a step-shaped profile.

10. Chopper according to claim 7, wherein said chopper housing is positioned such that the hopper is situated vertically thereabove and said outlet is positioned on an opposite side of the rotor from said feed slot and below said feed slot.

11. Chopper according to claim 7, wherein bodies interrupting air flow are positioned in the area of the chopper floor and have a step-shaped profile.

12. Chopper according to claim 1, wherein said slits extend vertically, are closely adjoining and are of various lengths in the chopping floor.

13. Chopper according to claim 12, wherein said chopper housing is positioned such that the hopper is situated vertically thereabove and said outlet is positioned on an opposite side of the rotor from said feed slot and below said feed slot.

14. Chopper according to claim 1, wherein said chopper housing is positioned such that the hopper is situated vertically thereabove and said outlet is positioned on an opposite side of the rotor from said feed slot and below said feed slot.

* * * * *